Jan. 3, 1956

R. STEVENSON 2,729,235

GAGE DAMPENING VALVE

Filed May 14, 1952

*INVENTOR.*
ROBERT STEVENSON
BY
*William Frederick Werner*
ATTORNEY

United States Patent Office 2,729,235
Patented Jan. 3, 1956

2,729,235

GAGE DAMPENING VALVE

Robert Stevenson, Barrington, R. I., assignor to Anco, Inc., a corporation of Rhode Island Application May 14, 1952, Serial No. 287,680

3 Claims. (Cl. 137—498)

This invention relates to a gage dampening valve and more particularly to a dampening valve which prevents fluid pressure damage to a gage.

One of the objects of the present invention is to prevent the sudden surges in a hydraulic system from breaking, upsetting or permanently distorting the gage which gives a reading of the fluid pressure in the system.

Another object of the present invention is to permit the needle on a gage in a hydraulic system to remain steady and be easily and accurately read.

And still another object of the present invention is to provide a dampening valve for a hydraulic system which cannot become disarranged; which is economical to manufacture due to the adaption of the individual parts to high speed production machinery and which requires a minimum number of manufacturing operations.

Other objects of the present invention will become apparent in part and be pointed out in part in the following specification and claims.

The present invention contemplates an inexpensive, foolproof insurance against damage and inefficiency in a costly hydraulic gage.

Like reference numerals refer to like parts in the accompanying drawings, in which.

Figure 1:
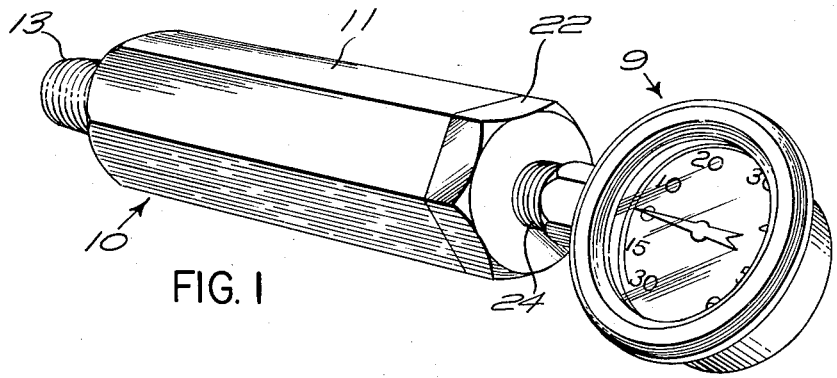
Figure 1 is a perspective view of the new gage dampening valve with a gage attached.

Referring to the drawings wherein reference character 10 generally indicates the new gage dampening valve and reference character 9 generally indicates a hydraulic gage.

The gage dampening valve 10 consists of a housing 11 having a projection 12 provided with threads 13 and an inlet port 14 terminating in a chamber 15 formed by an end wall 16 and a cylindrical wall 17 which has a recess 18 adjacent threads 20 formed in one end.

A gland 21 provided on its outside diameter with a shoulder 22 has a projection 23 with threads 24 on one side and threads 25 adapted to engage threads 20 in said housing, on its other side. A bearing 26 adjacent threads 25 is provided with a groove 27 adapted to house a neoprene O ring 28 which cooperates with cylindrical wall 17 to form a fluid tight seal. A quill 30 forms a ledge 31 with bearing 26. Internally gland 21 is provided with an outlet port 32 which terminates in a bore 33.

A primary piston 35 has a cylinder 36, an end 37 and a face 38 provided with three prongs 40 which abut wall 16; it is also provided with a sleeve 41 and a spring seat 42 formed in a wall 43.

A secondary piston 45 having a cylinder 46, a face 47 and a spring cavity 48 is provided with a hollow core 50 which forms a flange 51 with cylinder 46. The hollow of core 50 is indicated at 52. Three ports 53 are provided in hollow core 50. Reference numeral 54 designates the end of secondary piston 45.

In operation the various parts function as follows: Threads 13 will be united with threads in the line of a hydraulic system, the conduit of which will engage inlet port 14. The fluid will flow through inlet port 14 into chamber 15 formed between face 38 and wall 16 which always provides a minimum area because prongs 40 abut wall 16 never letting face 38 engage wall 16.

Fluid from chamber 15 will flow through the crevice formed between cylindrical wall 17 and cylinder 36 into cavity 55 formed by end 37, ledge 31, cylindrical wall 17 and sleeve 30. From cavity 55 the fluid will flow in the crevice between cylinder 46 and sleeve 30 to chamber 56 formed by flange 51, the end of gland 21, cylinder 46 and hollow core 50. The fluid will flow from chamber 56 through ports 53 into the hollow 52 of core 50 and into outlet port 32 to gage 9 secured to threads 24. Gage dampening valve 10 may be inserted into a line either horizontally or in a vertical position.

Figure 2:
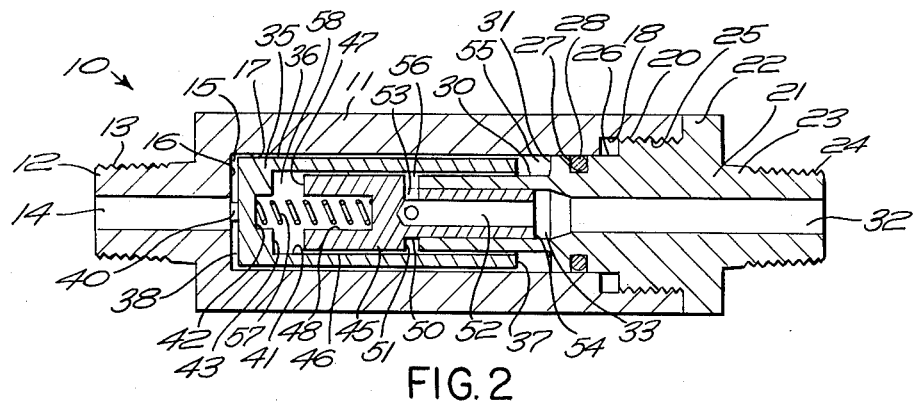
Figure 2 is a longitudinal sectional view showing the respective parts in normal operating position.
Figure 3:
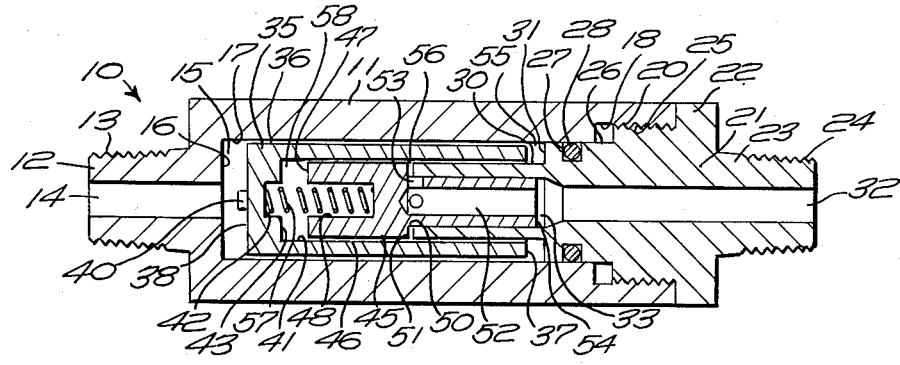
Figure 3 is a longitudinal sectional view, similar to Figure 1, showing the parts in operative position when a surge in the hydraulic system is dampened by the valve.

When a surge occurs in the line, the fluid will act against face 38 compressing spring 57 inserted between spring seat 42 and spring cavity 48 causing primary piston 35 to move toward the outlet side of the valve. The fluid in chamber 58 which has passed through the crevice formed between cylinder 46 and sleeve 41 will cushion the movement of primary piston 35 and with spring 57 will cause secondary piston 45 to move toward the outlet side of the line and in so doing will reduce the area of cavity 55 and chamber 56, restricting the flow of fluid which will pass through the ports 53, hollow 52 and outlet port 32 to gage 9 while at the same time increasing the area of chamber 15 for the reception of a larger volume of fluid, thereby reducing the pressure of the surge. Conversely, spring 57, the fluid in chamber 58 and the fluid in cavity 55 and chamber 56 will cause primary piston 35 and secondary piston 45 to return to the position shown in Figure 2, the normal operating position of the pistons.

Having shown and described, by way of example, a preferred embodiment of the present invention but not wishing to limit myself to the exact structure shown since structural arrangements are contemplated which would not depart from either the spirit or scope of the advancement made in the art.

What I claim is:

1. In a surge dampening valve the combination of a housing provided with means to be secured to a hydraulic pressure system, an inlet port and a chamber, a face in said chamber, a gland secured in said chamber with a fluid tight connection, a quill, a bore and an outlet port formed in said gland which is provided with means to be attached to a gage, a primary piston freely movable in said chamber, provided with an end wall and a sleeve adapted to freely engage said quill in said gland externally thereof and having prongs in said end wall abutting the face of said chamber, a secondary piston provided with a cylinder and a hollow core, said cylinder freely engageable with the sleeve in said primary piston, said hollow core slidably engageable with the bore in said gland, ports in said hollow core communicating with said bore and outlet port in said gland and resilient means interposed between said primary and secondary pistons, the sliding movement of said primary piston influencing the sliding movement of said secondary piston through said resilient means to cause the end of said quill to determine the effective flow area of said ports.

2. In a surge dampening valve the combination of a housing provided with means to be secured to a hydraulic pressure conduit, said housing having a first chamber, an inlet port communicating with said first chamber, a gland provided with means to form a fluidtight connection with said housing and provided with means to be secured to a hydraulic pressure conduit, a quill formed in one end of said gland, a bore and an outlet port formed along the axis of said gland, a primary piston provided with an end wall and a sleeve adapted to freely engage said quill externally thereof and freely engage said first chamber and vary the first chamber area on either end of said primary piston under the influence of the hydraulic fluid passing through said surge dampening valve around said primary piston and acting against said end wall, a secondary piston provided with a cylinder freely engaging said sleeve, and terminating in a hollow core provided with ports, the outside of said hollow core slidably engaging said bore, a second chamber formed between the end of said cylinder and the end of said quill and in communication with said ports, the sliding movement of said secondary piston varying the size of said second chamber and the effective area of said ports, resilient means interposed between said primary and said secondary pistons, the fluid passing between said primary piston and said quill and into the second chamber, then through said ports into the hollow of said hollow core and into said bore and outlet port.

3. In a surge dampening valve the combination of a housing provided with means to be secured to a hydraulic pressure system, an inlet port and a first chamber, a gland having a quill secured in said first chamber with a fluid-tight connection, a bore axially of said quill, an outlet port adjacent said bore formed axially in said gland which is provided with means to be attached to a hydraulic connection, a primary piston freely movable in said first chamber and means to form a space between said primary piston and said inlet port, said primary piston having a sleeve adapted to freely engage said quill externally thereof and form a second chamber between the end of said sleeve, quill and housing, a secondary piston provided with a cylinder and a hollow core, having a hollow area, said cylinder freely engageable with the sleeve in said primary piston and forming a third chamber between the end of said secondary piston and the base of said sleeve, resilient means interposed in said third chamber between the end of said secondary piston and the base of said sleeve, said secondary piston hollow core slidably mounted within the bore in said gland, ports in said hollow core, a fourth chamber formed between said secondary piston, the end of said quill and said sleeve, said ports in said hollow core providing a passageway between said fourth chamber, said hollow area and said bore in said gland.

References Cited in the file of this patent
UNITED STATES PATENTS
2,372,408   Trich _____ Mar. 27, 1945